United States Patent [19]
Anderson et al.

[11] 4,304,806
[45] Dec. 8, 1981

[54] INFORMATION CARRYING DISCS

[75] Inventors: Roger J. Anderson; Donald J. Kerfeld, both of St. Paul; Larry A. Lien, Forest Lake, all of Minn.

[73] Assignee: Minnesota Mining and Manufacturing Company, St. Paul, Minn.

[21] Appl. No.: 117,478

[22] Filed: Feb. 1, 1980

[51] Int. Cl.³ .................... B32B 3/02; B32B 27/38
[52] U.S. Cl. .................................. 428/65; 428/64; 428/215; 428/216; 428/163; 428/334; 428/335; 428/336; 428/447; 428/450; 428/416; 428/418; 264/106; 264/107; 369/275; 369/288; 369/284; 358/128.5; 346/76 L; 346/77 E; 346/135.1; 346/137
[58] Field of Search ............... 428/64, 65, 450, 447, 428/215, 216, 334–336, 416, 418, 163; 346/135.1, 137, 77 E, 76 L; 358/128.5; 179/100.1 B, 100.1 G; 369/283, 284, 286, 275, 288; 264/106, 107

[56] References Cited
U.S. PATENT DOCUMENTS

| | | | |
|---|---|---|---|
| 3,658,954 | 4/1972 | Broadbent | 264/1 |
| 3,795,534 | 3/1974 | Mehalso | 264/1 |
| 3,798,134 | 3/1974 | Hynes | 204/6 |
| 3,855,426 | 12/1974 | Bouwhuis | 179/100.3 V |
| 3,901,994 | 8/1975 | Mehalso | 428/163 |
| 4,006,271 | 2/1977 | French | 428/447 |
| 4,049,861 | 9/1977 | Nozari | 428/447 |
| 4,101,513 | 7/1978 | Fox | 528/19 |
| 4,126,726 | 11/1978 | Soeding | 428/163 |
| 4,130,620 | 12/1978 | Jarsen | 264/225 |
| 4,152,487 | 5/1979 | Yanagisawa | 428/65 |
| 4,188,433 | 2/1980 | Dijkstra | 428/64 |

FOREIGN PATENT DOCUMENTS 859711 4/1978 Belgium .
2519476 12/1977 Fed. Rep. of Germany .

*Primary Examiner*—Ellis P. Robinson
*Attorney, Agent, or Firm*—Cruzan Alexander; Donald M. Sell; Mark A. Litman

[57] ABSTRACT

An information carrying element comprising a substrate having adhered to at least one surface thereof a separate layer having a thickness of 1.0 to 100 microns and a circular or spiral pattern of surface variations provides a particularly useful element when said separate layer comprises an abrasion resistant polymer layer derived from 30 to 100% by weight of an epoxy-terminated silane.

12 Claims, No Drawings

INFORMATION CARRYING DISCS

FIELD OF THE INVENTION

The present invention relates to information carrying systems and more particularly to discs which carry light readable or stylus readable information. These discs may be useful in carrying information which is convertible to electronic signals for such varied uses as sound recordings, audio/visual recordings, or even computer type information retrieval.

BACKGROUND OF THE INVENTION

Information retrieval in the form of discs having information distributed in a circular or spiral pattern has been available in various forms for many years. Early forms of musical reproduction equipment, for example, used discs with either holes or protuberances to pluck an array of strings or vibrating posts to produce music. Early displays of moving pictures operated by rotation of a disc bearing consecutive images on the periphery. The most common form of storing reproductions of musical performances, which has been in use for about one hundred years, is the phonograph record which uses a spiral pattern of grooves having vertical and horizontal modulations to generate signals which can be converted to sound.

With the introduction of the laser to industry, a new information storage system was developed which comprised a disc having a circular or spiral pattern of depressions or protuberances which would disturb, reflect, or refract incident light patterns. These information storing discs, often used for storage of audio/visual information and generally referred to as video discs, are well known in the art. Such U.S. Pat. Nos. as 3,658,954 (Apr. 25, 1972); 3,795,534 (Mar. 5, 1974); 3,798,134 (Mar. 19, 1974); 3,855,426 (Dec. 17, 1974); 3,901,994 (Aug. 26, 1975); 4,124,672 (Nov. 7, 1978); 4,126,726 (Nov. 21, 1978); and 4,130,620 (Dec. 19, 1978) show various constructions, compositions, and processes for forming video discs.

In addition to the laser readable video disc, another commericial construction is used which is more similar to the classic phonograph recording. This type of construction, as described in RCA Review, Vol. 39, No. 1, March 1978, comprises a spiral array of grooves which is tracked by a stylus. The grooves are impressed with coded information in the form of vertical and/or radial modulations.

Even though these systems are read by totally different techniques, they are affected by similar, if not identical, problems. Imperfections in the depressions, protuberances, or modulations cause undesirable or spurious signals to be generated. The imperfections can be produced during manufacture of the disc or can develop from wear during use or manipulation of the disc.

The present invention relates to information storage discs for use with laser or stylus readout systems which have good fidelity and resistance to wear.

SUMMARY OF THE INVENTION

It has been found according to the present invention that information storage devices comprising disc blanks or discs having a circular or spiral pattern of depressions, protuberances, and/or grooves with or without modulations can be constructed from a substrate, having as the information bearing layer on at least one surface thereof, a layer comprised of from 30–100% by weight of an epoxy-terminated silane.

Epoxy-terminated silanes are known in the art as represented by U.S. Pat. Nos. 3,955,035; 4,049,861; 4,069,368; 4,101,513; and others, where the epoxy-terminated silanes are disclosed as useful in forming smooth, transparent abrasion resistant coatings. These materials may be described by the formulae:

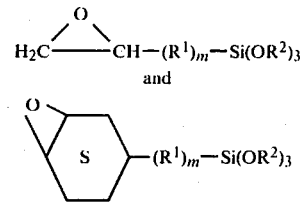

and

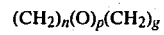

wherein
$R^1$ is a non-hydrolyzable divalent hydrocarbon group (aliphatic, aromatic or aliphatic and aromatic containing) of less than 20 carbon atoms or a divalent group having less than 20 carbon atoms composed of C, H, S, N, and O atoms as the only atoms which may appear in the backbone of the divalent group, the O atoms appearing as ether linkages if present, and with no two adjacent heteroatoms in the divalent group. This description is the definition of non-hydrolyzable divalent group for $R^1$;

$R^2$ is an aliphatic group of less than 10 carbon atoms or an acyl group of less than 10 carbon atoms; and m is 0 or 1.

The group $R^1$ is preferably alkylene of from 1 to 8 carbon atoms and most preferably is represented by the formula:

$$(CH_2)_n(O)_p(CH_2)_g$$

wherein
n is 1 to 4, and most preferably 1,
p is 0 or 1 and most preferably 1,
g is 1 to 6 and most preferably 3.

The group $R^2$ is preferably alkyl of 1 to 6 carbon atoms, more preferably alkyl of 1 to 3 carbon atoms, and most preferably methyl.

In the practice of the present invention, the epoxy-terminated silanes may be formed into the high density information storage layers from monomers, hydrolyzates, or precondensates of these compounds. The formation of these hydrolyzates and precondensates is thoroughly described in U.S. Pat. Nos. 4,049,861 and 4,100,134.

The compositions used in making the information storage layer for the discs of the present invention include from 30–100% by weight of the epoxy-terminated silane. That is, the information carrying layer is the crosslinked product of the epoxy-terminated silane in combination with from 0–70% by weight of a copolymerizable material. Such copolymerizable materials include styrene, methyl styrene, vinyl amides, vinyl ethers, epoxy resins, polyols, silanes and other materials known to be copolymerizable with either epoxy resins or silanes. The most preferred comonomers are epoxy compounds. These may generally be described by the formula:

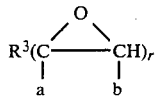

wherein
R³ is an aliphatic or cycloaliphatic group,
r is the valence of R³ and is an integer of from 2 to 6,
a and b are H, or when fused together, represent the atoms necessary to form a 5- or 6-membered cycloaliphatic ring.

Preferably said epoxy resin, upon homopolymerization, forms a polymer having a glass transition temperature below +25° C. and has a molecular weight of at least 100 per epoxy group. Preferred compounds are the diglycidyl ether of bisphenol A, 3,4-epoxycyclohexylmethyl-3,4-epoxy-cyclohexane-carboxylate, 1,4-bis(2,3-epoxypropoxy)butane, limonene dioxide, and limonene oxide.

The structure of the information carrying discs of the present invention comprises a substrate having the information impressed or blank groove impressed epoxy-terminated silane coating layer on at least one side thereof. The substrate may be substantially any solid material, including but not limited to polymeric materials such as polycarbonates, polyesters, polyacrylates, polyurethanes, polyolefins, polyvinyl resins, polyamides, and polysiloxanes; ceramic or glass materials; fibrous materials; metals; etc. The surface of the substrate to be coated should itself be smooth. It would not be desirable to have surface irregularities having dimensions in excess of 2 μm. The backing may be transparent or opaque depending upon the readout system used. If the backing is opaque, a master transparent to the curing radiation must be used. Primer layers may be used between the substrate and the information carrying layer, but this is not essential depending upon the ability of the coating to adhere to the base. On polyesters, for example, polyvinylidene chloride is a useful primer. The substrate may be of any thickness, but is usually from 50 to 5000 μm. The information carrying layer is critical in its dimensions and must be between 1.0 and 25 μm in its maximum thickness for a video disc and up to 100 μm for an audio disc. The term maximum thickness is used, because the layer, having depressions, protuberances, or grooves thereon, varies in thickness. This limit therefore applies to the maximum thickness of the layer above the substrate. Preferably it is between 2.0 and 20 μm in maximum thickness and most preferably between 3.0 and 10 μm for a video disc. The preferred dimensions are between 15 and 75 μm for an audio disc.

The information is encoded on the information carrying layer as depressions, protuberances, and/or grooves with or without modulations in either a circular, arc-like (e.g., semicircular, hyperbolic, etc., or spiral pattern on the layer. The depth or height of the information carrying deformity from the plane of the surface or the mean height of the surface is normally between 0.03 to 2 μm. In laser readout systems, this dimension is usually between 0.03 and 1.5 μm, preferably between 0.05 and 0.8 μm, and more preferably between 0.07 and 0.5 μm. In stylus readout systems, this dimension is usually between 0.05 and 2 μm, preferably between 0.08 and 1.5 μm, and more preferably between 0.10 and 1.0 μm. For an LP record, this dimension is preferably between 25 and 75 μm. The width (peak to peak) between grooves in audo systems is about 60-80 μm.

The light read systems may have a metallized coating over the information carrying surface and another polymer layer, preferably of an abrasion resistant material, over the metal layer, if a reflective rather than transmissive readout system is being used. These coatings can be laid by a variety of manners including vapor deposition or reduction of metal salt solutions.

Alternatively, two reflectively metallized discs may be adhesively secured together so that the two information bearing surfaces are sandwiched in the middle of the composite and information is then read reflectively through a transparent substrate.

Capacitively read discs may have a metallized coating applied to the replicated information bearing surface to provide electrical conductivity. The metallized coating may then be provided with an electrically insulative overlayer.

Replicas to be read with a stylus may also use a lubricant or lubricating layer on the information bearing surface to minimize stylus wear.

Preferably the information is encoded into the information carrying layer in a spiral pattern rather than a circular pattern so that the reading element can follow a single path rather than having to shift from one concentric circle to another.

If the information carrying layer is to be penetrated by light during readout, it must be transmissive of the reading radiation. Ordinarily a fairly narrow band of radiation is used to read the discs so that the information carrying layer may have to be transmissive of at least 50% of the radiation in a 100 nm, 50 nm, or even 30 nm band. Preferably the layer is transmissive of at least 75 to 90% of the radiation within such a band.

The composition of the information carrying layer may include various materials which may improve or not adversely affect the properties of the layer. For example, the use of alkoxy substituted metals such as disclosed in column 5, lines 36-59 of U.S. Pat. No. 4,049,861 will improve the conductivity of the layer and reduce static charge buildup. Polymeric additives such as those disclosed in U.S. Pat. Nos. 3,955,035 and 4,082,846 may be useful. Flow control aids and surfactants, as are well known in the art, could be added to compositions of the present invention. Dyes could be added to the compositions which would be transmissive of the radiation used to read the encoded information.

There will also, of course, be a residue or an unchanged amount of catalyst or delatentized catalyst in the composition. A broad range of catalysts has been found useful, but with some more preferred than others. U.S. Pat. No. 3,955,035 broadly disclosed the use of Lewis or Bronstad acids for curing epoxy silanes, U.S. Pat. No. 4,049,861 discloses highly fluorinated aliphatic sulfonic or sulfonylic acids as catalysts for these materials, U.S. Pat. No. 4,101,513 discloses light sensitive polyaromatic onium catalysts, some of which are particularly useful for curing materials according to the present invention, and U.S. Pat. no. 4,130,690 shows a class of Lewis acid catalysts of high efficiency for curing epoxy-terminated silanes. The more preferred catalysts are the highly fluorinated aliphatic sulfonylic catalysts, the high efficiency Lewis acid catalysts ($PF_6$, $SbF_6$ and $HSbF_5$) and the complex polyaromatic sulfonium and iodonium salts (i.e., those having $BF_4^-$, $PF_6^-$, $SbF_6^-$, $SbF_5^-OH$ and $ArF_6^-$ as anions).

One important aspect of the present invention is that the low applied pressures and low temperatures associated with the use of liquid compositions allows for the use of non-metallic stampers and masters.

These and other aspects of the present invention will be shown in the following examples.

EXAMPLE 1

A highly hydrolyzed precondensate of γ-glycidoxypropyltrimethoxy silane (about 80–90% of methoxy groups removed) (70 gm) was mixed with 30 gm of 1,4-diglycidoxylbutane and 2 gm of triarylsulfonium hexafluoro-antimonate photocatalyst (described in assignee's U.S. Pat. No. 4,173,476) by shaking for 3 hours. Bubbles were then removed from the mixture by placing it in an evacuated chamber for 15 minutes. The resulting photopolymerizable material was used to make a video disc replica according to the following roll coating process.

A nickel video disc stamper was utilized. Approximately 2.0 cm$^3$ of the material prepared as described above was spread by a cylindrical coating roller between a video disc stamper and a primed 0.18 mm polyester film. The sheet of 0.18 mm thick polyester film was positioned between the stamper and the roller to serve as a base element. This rolling process spread out a bubble free coating of resin composition over the surface of the stamper and simultaneously covered it with the polyester sheet. The stamper covered in this manner was then passed at 3 cm/sec under a 200 watt/inch high intensity medium pressure Hg vapor lamp. The UV exposure cured and hardened the resin composition. After this exposure, the laminated structure containing the replicated information was easily peeled from the nickel stamper. The sheet was then cut to produce a circular center hole and a circular outside edge, both concentric with the replicated information tracks.

The resulting video disc replica had an information bearing layer which was approximately 10±5 μm thick which did not curl when layed on a flat surface. It retained this flatness after more than one year under ambient conditions and produced a good television picture when played on a commercial video disc player.

EXAMPLE 2

A video disc replica was made as in Example 1. However, the resin composition used was made by mixing 90 gm of the precondensate of Example 1 with 10 gm of the diglycidyl ether of 1,4-butanediol and 2 gm of the photocatalyst of Example 1. The video disc replica made by this process has an information bearing layer which was 8±5 μm thick. The replica was initially flat, but in three months, developed a curl which then made it unsuitable for playing on a video disc player. It has been found that it is desirable to have increasingly thinner coating layers and, to some degree, thicker substrates, as higher percentages of epoxy-terminated silane are used. The disc of this example was highly abrasion resistant and initially produced an excellent video image upon being played.

EXAMPLE 3

A video disc replica was made as in Example 1 with the following changes. The resin composition was made by mixing 50 gm of the precondensate, 50 gm of the diepoxide of Example 1 and 2 gm of the photocatalyst. The resulting disc replica had a cured information bearing layer which was 7±3 μm thick. This replica did not curl when laid on a flat surface. It retained its flatness even after a one month period of time. The replica produced a good television picture when played on a video disc player.

EXAMPLE 4

A video disc replica was again made as in Example 1, however, the resin composition was a mixture of 100 gm of the precondensate of Example 1 and 2 gm of the photocatalyst. The resulting video disc had an information bearing layer which is 14±4 μm thick. It was initially flat, but upon standing for three months, it developed a curl which then made it unsuitable for playing on a video disc player.

EXAMPLE 5

A resin composition was made by mixing 70 gm of a 50 to 60% hydrolyzed precondensate of γ-glycidoxypropyltrimethoxy silane with 30 gm of the diepoxide of Example 1 and 2 gm of the photocatalyst of Example 1. The resulting material was used to make a video disc according to the procedure of Example 1. The video disc replica made in this way had a cured information bearing layer 7±3 μm thick. This disc lay flat when placed on a level surface. It maintained its flatness after aging under normal room conditions for three months. It provided a good television picture when played on a video disc player.

EXAMKPLE 6

A video disc replica was made as in Example 5. However, the resin composition was made by mixing 50 gm of the precondensate of Example 5, 50 gm of the same diepoxide of Example 1 and 2 gm of the photocatalyst of Example 1. The resulting disc replica had an information bearing layer thickness of 7.5±2.5 μm. It lay flat when placed on a level surface and maintained this flatness after aging at normal room conditions for three months. It produced a good television picture when used with a video disc player.

EXAMPLE 7

A video disc replica was made as in Example 5. However, the resin composition was made by mixing 30 gm of the precondensate of Example 5, 70 gm of the diepoxide of Example 1, and 2 gm of the photocatalyst of Example 1. The resulting replica had an information bearing layer with a thickness of 3±2 μm. Both before and after aging three months under normal room conditions, this disc lay flat when placed on a level surface. It produced a good television picture when used with a video disc player.

EXAMPLE 8

A video disc replica was made according to the procedure of Example 1. The resin composition was made by mixing 100 gm of the precondensate of Example 5 with 2 gm of the photocatalyst of Example 1. The resulting replica had an information bearing layer which was 6.5±1.5 μm thick. When first made, this disc lay flat when placed on a level surface. However, after aging under normal room conditions for three months, it curled up when placed on such a surface and was then not suitable for playing on a video disc player.

EXAMPLE 9

A video disc replica was made according to the procedure of Example 1. The resin composition used was a mixture of 90 gm of the precondensate of Example 5, 10 gm of the diglycidyl ether of 1,4-butanediol and 2 gm of the photocatalyst of Example 1. The resulting disc had an information bearing layer with a thickness of 6.5±1.5 μm. When first made, the disc lay flat when placed on a level surface. However, after aging for three months under normal room conditions, the disc curled up when placed on such a surface and was then not suitable for use on a video disc player.

EXAMPLES 10-14

Video disc replicas were made according to the procedure of Example 1. The resin composition was a mixture of γ-glycidoxypropyltrimethoxysilane, the diglycidyl ether of 1,4-butanediol and the catalyst of Example 1. The amount of each component used for the corresponding example is shown below.

TABLE 1

| Ex. | Epoxy-silane (gm) | Diepoxide (gm) | Photocatalyst (gm) | Thickness (μm) |
|---|---|---|---|---|
| 10 | 100 | 0 | 2 | 4-6 |
| 11 | 90 | 10 | 2 | 3-5 |
| 12 | 70 | 30 | 2 | 5-13 |
| 13 | 50 | 50 | 2 | 2-6 |
| 14 | 30 | 70 | 2 | 8-14 |

All of these discs lay flat when placed on a level surface both before and after aging for three months under normal room conditions. They all provided a very good television picture when used with a commercial video disc player with the exceptions of Examples 10, 11 and 12 which were acceptable, but in which the signal level was slightly low.

EXAMPLES 15-22

A series of discs were made according to the procedure of Example 1. The hydrolyzable silane or precondensate thereof and the amount of diglycidyl ether of 1,4-butanediol in the resin composition are shown below. These discs were then cured by placing them for 7 minutes under a bank of low intensity "black lights." All these discs were flat and produced a good television picture when first produced. Examples 15-18 were then aged for 71½ hours at 55° C., 16% R.H. All discs retained their flatness in this aging.

Examples 19-22 were aged 71½ hours at 50° C., 85% R.H. None of the discs curled appreciably when subjected to this environment. However, because of the low levels of epoxy-terminated silane (ETS), Examples 15-22 were not abrasion resistant.

TABLE 2

| Ex. | % Methoxy Groups Removed | ETS (gm) | Diepoxide (gm) | Photocatalyst (gm) | Thickness (μm) |
|---|---|---|---|---|---|
| 15 | — | 0 | 100 | 2 | 8-15 |
| 16 | 0 | 10 | 90 | 2 | 3-10 |
| 17 | 50 | 10 | 90 | 2 | 3-10 |
| 18 | 90 | 10 | 90 | 2 | 3-8 |
| 19 | — | 0 | 100 | 2 | 3-13 |
| 20 | 0 | 10 | 90 | 2 | 3-14 |
| 21 | 50 | 10 | 90 | 2 | 3-15 |
| 22 | 90 | 10 | 90 | 2 | 3-10 |

EXAMPLES 23-30

A series of discs was made according to the procedure of Example 1. The hydrolyzable silane or precondensate thereof and the components of resin composition are shown below. All of these discs were adequately flat immediately after preparation. However, after aging 74 hours at 55° C., 17% R.H., the disc of Example 28 had developed an excessive curl. When these discs were further aged for 88 hours at 50° C. and 85% R.H., the discs of Examples 23, 24 and 27 also developed excessive curl. These results and the results of Examples 15-22 tend to indicate that adding a flexibilizer helps to maintain disc flatness. It is also important to note that the discs with thick information bearing layers curled more than those with thin coatings.

TABLE 3

| Ex. | % Methoxy Groups Removed | ETS (gm) | Diepoxide (gm) | Photocatalyst (gm) | Thickness (μm) |
|---|---|---|---|---|---|
| 23 | 0 | 100 | 0 | 2 | 0-8 |
| 24 | 0 | 100 | 0 | 2 | 5-18 |
| 25 | 0 | 50 | 50 | 2 | 8-18 |
| 26 | 0 | 50 | 50 | 2 | 8-23 |
| 27 | 90 | 100 | 0 | 2 | 8-11 |
| 28 | 90 | 100 | 0 | 2 | 13-25 |
| 29 | 90 | 50 | 50 | 2 | 5-13 |
| 30 | 90 | 50 | 50 | 2 | 8-18 |

EXAMPLE 31

A resin composition was made by mixing 50 gm of the precondensate of Example 1 with 50 gm of the diepoxide of Example 1, 2 gm diphenyliodonium hexafluorophosphate and 0.4 gm 2-ethyl-9,10-dimethoxyanthracene. The resulting material was used to make a video disc according to the procedure of Example 1 except that the resin was cured under a bank of low intensity "black lights" for 7 minutes. The video disc replica made in this way had a cured information bearing layer 7.5±2.5 μm thick. This disc lay flat when placed on a level surface. It provided a good television picture when played on a video disc player.

EXAMPLE 32

A resin composition was made by mixing 50 gm of the precondensate of Example 5 with 50 gm of the diepoxide of Example 1, 2 gm diphenyliodonium hexafluorophosphate and 0.4 gm 2-ethyl-9,10-dimethoxyanthracene. The resulting material was used to make a video disc according to the procedure of Example 1 except that the resin was cured under a bank of low intensity "black lights" for 7 minutes. The video disc replica made in this way had a cured information bearing layer 7.5±2.5 μm thick. This disc lay flat when placed on a level surface. It provided a good television picture when played on a video disc player.

EXAMPLE 33

A sample of commercially available PVC film 14 inches square was prepared for use as a video disc substrate in the following two steps. In the first step, the sheet was placed between two flat, smooth chrome-steel plates. The plates were in turn sandwiched between four layers of cardboard and the resultant stack pressed for 10 minutes in a hydraulic press. The press was operated with a force of 114 metric tons, and the press platens were held at a temperature of 160° C. The pressing operation reduced the surface roughness present on the manufactured film and provided suitable flatness.

In the second step, in order to promote adhesion of the photopolymerizable material to the PVC substrate, the substrate was next placed in a Vecco Model 776 radio frequency diode sputtering apparatus operating at a frequency of 13.56 MHz. The substrate was then subjected to a radio frequency sputter etch as disclosed in assignee's copending application Ser. No. 80,530 (filed Oct. 10, 1979).

The substrate thus prepared was used to make a video disc replica according to the procedure and composition of Example 1. The resulting video disc showed good adhesion of the cured polymer layer to the PVC substrate. The disc lay flat when placed on a level surface. It retained this flatness after aging for 7 months under normal room conditions. The disc produced a good television picture when played on a video disc player. Information should be read from this disc with the laser beam incident from either side of the disc.

EXAMPLE 34

A sheet of cast acrylic material (polymethylmethacrylate) 1 mm thick was sputter-etched according to the procedure of Example 33 in order to promote adhesion of the photopolymer. The resin composition of Example 1 was used. The roll-coating technique of Example 1 was used, but the semi-flexible base element was allowed to bend slightly when it was simply lowered slowly onto the stamper as the roller moved along. The resin composition was cured with a bank of low intensity UV lamps, and the replica stripped from the stamper. An aluminum coating 30 nm thick was vapor coated on the surface of the information bearing layer. A circular hole was cut in the center of the disc, and a circular outer edge was cut. The resulting disc was then placed on a commercial video disc player. The laser beam was indicent through the uncoated acrylic surface. A good television picture was obtained.

The following Table 4 is presented to show at a glance the preferred compositions for producing a video disc article according to this invention.

TABLE 4

| Ex. | Epoxy-Terminated Silane Monomer (gm) | Diepoxide (gm) | Photocatalyst (gm) | Thickness (μm) | Remarks |
|---|---|---|---|---|---|
| 10 | 100 | 0 | 2 | 4–6 | Signal level somewhat low |
| 11 | 90 | 10 | 2 | 3–5 | Signal level somewhat low |
| 12 | 70 | 30 | 2 | 5–13 | Signal level somewhat low |
| 13 | 50 | 50 | 2 | 4–6 | |
| 14 | 30 | 70 | 2 | 8–14 | |
| 16 | 10 | 90 | 2 | 3–10 | |
| 20 | 10 | 90 | 2 | 3–14 | |
| 23 | 100 | 0 | 2 | 0–8 | Curls upon aging |
| 24 | 100 | 0 | 2 | 5–18 | Curls upon aging |
| 25 | 50 | 50 | 2 | 8–18 | |
| 26 | 50 | 50 | 2 | 8–23 | |
| 31 | 50 | 50 | 2 | 8–30 | |

| Ex. | % Methoxy Group Removed | Precondensate (gm) | Diepoxide (gm) | Photocatalyst (gm) | Thickness (μm) | Remarks |
|---|---|---|---|---|---|---|
| 8 | 50 | 100 | 0 | 2 | 5–8 | Curls upon aging |
| 9 | 50 | 90 | 10 | 2 | 5–8 | Curls upon aging |
| 5 | 50 | 70 | 30 | 2 | 4–10 | |
| 6 | 50 | 50 | 50 | 2 | 5–10 | |
| 7 | 50 | 30 | 70 | 2 | 1–5 | |
| 17 | 50 | 10 | 90 | 2 | 3–10 | |
| 21 | 50 | 10 | 90 | 2 | 3–15 | |
| 32 | 60 | 50 | 50 | 2 | 8–23 | |
| 27 | 90 | 100 | 0 | | 8–11 | Curls upon aging |
| 28 | 90 | 100 | 0 | 2 | 13–25 | Curls upon aging |
| 4 | 90 | 100 | 0 | 2 | 10–18 | Curls upon aging |
| 2 | 90 | 90 | 10 | 2 | 3–13 | Curls upon aging |
| 1 | 90 | 70 | 30 | 2 | 5–15 | |
| 3 | 90 | 50 | 50 | 2 | 4–10 | |
| 29 | 90 | 50 | 50 | 2 | 5–13 | |
| 30 | 90 | 50 | 50 | 2 | 8–18 | |
| 18 | 90 | 10 | 90 | 2 | 3–8 | |
| 22 | 90 | 10 | 90 | 2 | 3–10 | |
| 33(PVC) | 90 | 70 | 30 | 2 | | |

TABLE 4-continued

| | | | | | |
|---|---|---|---|---|---|
| 34(PMMA) | 100 | 70 | 30 | 2 | |
| 15 | | 0 | 100 | 2 | 8-15 |
| 19 | | 0 | 100 | 2 | 3-13 |

Table 4 thus helps to illustrate that, for the base elements chosen and thicknesses of information bearing layers produced, in order to avoid curl with hydrolyzed monomer and low signal level with non-hydrolyzed monomer, at least about 30% by weight of comonomer flexibilizing material is preferred. It is also useful to observe where the information bearing layer begins to lose its abrasion resistance. Thus, for substantial abrasion resistance, it appears desirable to use less than about 70 percent by weight of comonomer flexibilizing agent.

EXAMPLE 35

A video recording was made in a commercially available polymeric photoresist layer which was developed by standard wash-development techniques after exposure. The recording was then vapor coated with 10 nm of chrome. The resulting photoresist master was used in place of a nickel stamper to make a video disc replica according to the procedures of Example 1. This replica was playable. When vapor coated with 10 mm of chrome and used in place of a nickel stamper, repeated playable replications were made.

EXAMPLE 36

An audio record replica was prepared using commercially available 1 mm polyvinylchloride as the base element. The resin composition of Example 3 was used with the roll-coating technique of Example 1. The semi-flexible base element was allowed to bend slightly as it was lowered slowly onto the audio record stamper as the roller moved along. The resin composition was cured with a bank of low intensity UV lamps, and the replica stripped from the stamper. A circular hole was cut in the center of the record and a circular outer edge was cut. The resulting replica had an information bearing layer approximately 50 $\mu$m thick. The audio record replica was successfully played on a conventional stereo audio system.

EXAMPLE 37

A resin composition was made by mixing 70 gm of a 60% hydrolyzed precondensate of $\beta$-(3,4-epoxycyclohexyl)-ethyl-trimethoxysilane with 30 gm of the diepoxide of Example 1 and 2 gm of the photocatalyst of Example 1. The resulting material was used to make a video disc according to the procedure of Example 1 except that the resin was cured under a bank of low intensity "black lights" for 10 minutes. The video disc replica made in this way had a cured information bearing layer 9±4 $\mu$m thick. This disc lay flat when placed on a level surface. It provided a good television picture when played on a video disc player.

EXAMPLE 38

A resin composition was made by mixing 70 gm of $\beta$-(3,4-epoxycyclohexyl)-ethyltrimethoxy-silane with 30 gm of limonene oxide and 2 gm of the photocatalyst of Example 1. The resulting material was used to make a video disc according to the procedure of Example 1 except that the resin was cured under a bank of low intensity "black lights" for 10 minutes. The video disc replica made in this way had a cured information bearing layer 2.5±1 $\mu$m thick. The disc lay flat when placed on a level surface. It provided a television picture when played on a video disc player although the signal level was somewhat low.

EXAMPLE 39

A resin composition was made by mixing 90 gm $\beta$-glycidoxypropyltrimethoxy silane with 10 gm limonene oxide and 2 gm of the photocatalyst of Example 1. The resulting material was used to make a video disc according to the procedure of Example 1 except that the resin was cured under a bank of low intensity "black lights" for 30 minutes. The video disc replica made in this way had a cured information bearing layer 5±3 $\mu$m thick. This disc lay flat when placed on a level surface. It provided a television picture when played on a video disc player but gave a slightly low signal level.

It has been found that the quality of signal replication, as measured by the level of the radio frequency (RF) signal obtained on playback, is improved by prehydrolyzing the epoxy-terminated silane. Evidence for this is shown in Table 5.

Table 5 lists the RF signal level obtained when replicas of Examples 2 to 14 were played on the same player. All of the replicas were made from the same stamper. In this table, the examples are grouped according to the amount of diepoxide in the formulation. It can be seen that, for a given amount of diepoxide, the signal level increases with increasing prehydrolysis of the epoxy-terminated silane. For this reason at least 30% removal of alkoxy groups is preferred.

TABLE 5

| Example | Wt. % Diepoxide | % Methoxy Groups Prehydrolyzed | RF Signal Level, mV |
|---|---|---|---|
| 8 | 0 | 50-60 | 600 |
| 10 | 0 | 0 | 450 |
| 2 | 10 | 90 | 675 |
| 9 | 10 | 50-60 | 650 |
| 5 | 29 | 50-60 | 550 |
| 12 | 29 | 0 | 525 |
| 3 | 49 | 90 | 575 |
| 6 | 49 | 50-60 | 550 |
| 13 | 49 | 0 | 500 |
| 7 | 69 | 50-60 | 600 |
| 14 | 69 | 0 | 600 |

What is claimed is:

1. An information carrying element comprising a substrate having adhered to at least one surface thereof a separate layer having a maximum thickness of 1.0 to 100 $\mu$m and a circular or spiral pattern of surface variations in the form of depressions, protuberances, and/or grooves with or without modulations, said separate layer comprising an abrasion resistant polymer layer derived from 30 to 100% by weight of an epoxy-terminated silane.

2. The element of claim 1 wherein said epoxy-terminated silane is described by either of the formulae:

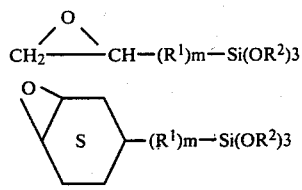

wherein
$R^1$ is $(CH_2)_n\text{-}(O)_p\text{-}(CH_2)_g$ wherein n is 1 to 4, p is 0 or 1, g is 1 to 6,
$R^2$ is alkyl of 1 to 6 carbon atoms and
m is 0 or 1.

3. The element of claim 2 wherein m is 1.

4. The element of claim 3 wherein p is 1.

5. The element of claim 1 wherein said epoxy-terminated silane is γ-glycidoxypropyltrimethoxy silane.

6. The element of claims 2 and 4 wherein said substrate is transparent and said pattern is a spiral pattern of depressions and/or protuberances.

7. The element of claim 6 wherein said separate layer has a metal coating thereon.

8. The element of claim 1 having a second said separate layer adhered to another surface of said substrate.

9. The element of claim 6 wherein said depressions and/or protuberances have vertical dimensions of between 0.03 to 2 μm.

10. The element of claim 6 wherein said substrate is between 50 and 5000 μm thick and does not have surface irregularities with dimensions in excess of 2 μm and said separate layer comprises a polymer derived from 0 to 70 percent by weight of an epoxy resin of the formula:

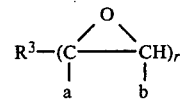

wherein $R^3$ is an aliphatic or cycloaliphatic group, r is the valence of $R^3$ and is an integer of from 2 to 6, and a and b are H or when fused together represent the atoms necessary to complete a 5- or 6-membered cycloaliphatic ring.

11. The element of claim 10 wherein said information carrying element comprises a disc having a spiral pattern on said separate layer having encoded information in the form of information carrying deformities selected from the class of depressions and protuberances, the depth or height of the information carrying deformities from the mean height of the surface being between 0.03 and 2 μm, and the maximum thickness of said separate layer being between 1 and 25 μm.

12. The element of claims 1, 4 or 10 wherein said epoxy-terminated silane was prehydrolyzed by having at least 30% of its alkoxy groups removed.

* * * * *

UNITED STATES PATENT AND TRADEMARK OFFICE
CERTIFICATE OF CORRECTION

PATENT NO. : 4,304,806
DATED : December 8, 1981
INVENTOR(S) : Roger Anderson, Donald J. Kerfeld and Larry A. Lien It is certified that error appears in the above—identified patent and that said Letters Patent is hereby corrected as shown below:

Column 4, line 2, delete "audo" and insert --audio-- in its place.

Column 6, line 31, delete "EXAMKPLE" and insert --EXAMPLE-- in its place.

Column 9, line 20, delete "should" and insert --could-- in its place.

Column 10, line 18, delete "indicent" and insert --incident-- in its place.

Signed and Sealed this

Ninth Day of November 1982

[SEAL]

Attest:

GERALD J. MOSSINGHOFF

Attesting Officer    Commissioner of Patents and Trademarks